June 30, 1936.  A. A. H. UHALT ET AL  2,045,890
SERVICE CABINET
Filed Nov. 7, 1932
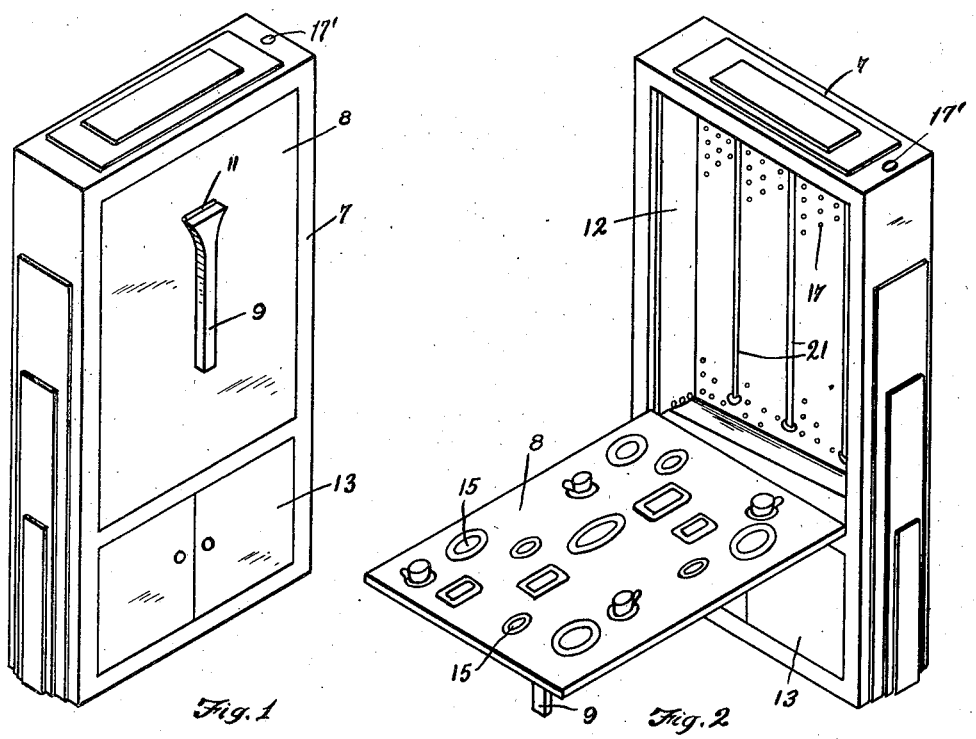
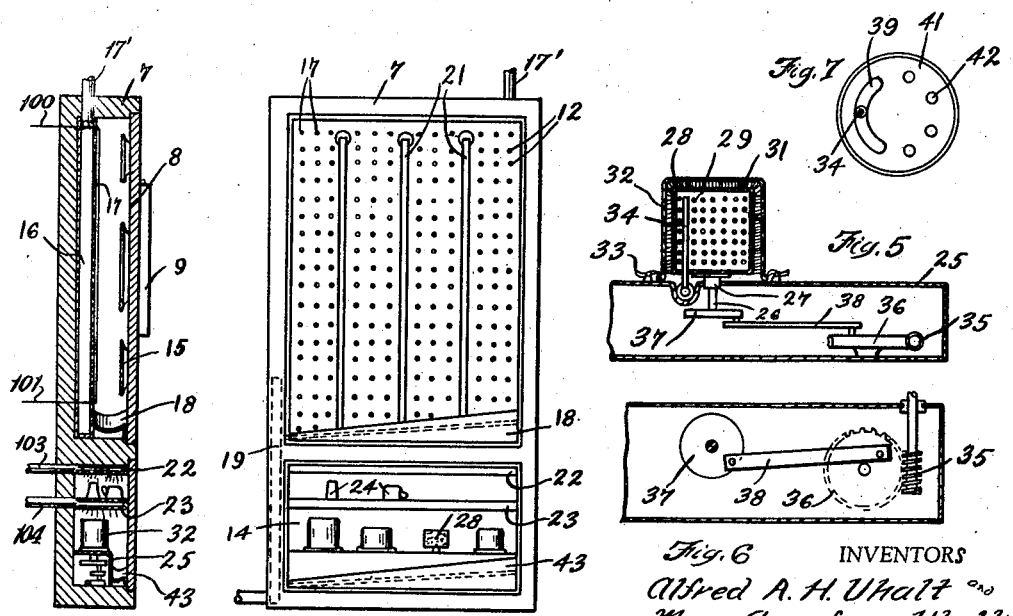
INVENTORS
Alfred A. H. Uhalt and
BY Mary Ann Levy Uhalt
Fay, Oberlin & Fay
ATTORNEYS Patented June 30, 1936

2,045,890

UNITED STATES PATENT OFFICE 2,045,890

SERVICE CABINET

Alfred A. H. Uhalt and Mary Ann Levy Uhalt, Cleveland, Ohio

Application November 7, 1932, Serial No. 641,498

2 Claims. (Cl. 141—9)

The present invention relates to a cabinet adapted to facilitate the preparation and consumption of meals, especially in households where the space devoted to these activities is somewhat limited. More particularly, the invention relates to a cabinet comprising a set of dishes sufficient for the serving of a meal and automatic washing means so arranged that the dishes and other utensils are washed and made ready for the next meal with a minimum of attention from the housewife.

In the development of devices for minimizing the labor of housekeeping, attention has been given to facilities which aid in the preparation of food and the serving of meals, particularly in a combination kitchen and dining room where space is restricted. One of these devices is illustrated in Patent No. 1,881,416, dated October 4, 1932, describing a mat or panel to which a number of dishes is permanently attached in the proper positions to constitute a meal service. The present invention contemplates an apparatus in which such a panel is incorporated in a washing cabinet provided with washing means which operate on the soiled dishes and prepare them for use at the next meal. In addition, means are provided for washing pots and pans and other utensils used in preparing or serving a meal, so that mose of the articles necessary in this domestic activity are always ready for the preparation of the next meal.

It is, accordingly, an object of the present invention to provide a service cabinet which always supplies clean dishes and cooking utensils for the preparation of a meal. Another object of the invention is to provide a cabinet of this type in which the cleaning operation is automatic and requires a minimum of attention from the housewife. A further object of the invention is to provide a washing cabinet in which garbage is automatically disposed of. A still further object of the invention is to provide a cabinet of the class described in which scouring means are provided for the cleaning of pots and pans. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a perspective view of a service cabinet when closed; Fig. 2 is a perspective view of the cabinet when open; Fig. 3 is a front elevation showing the interior of the cabinet; Fig. 4 is a transverse section through the closed cabinet; Fig. 5 is an enlarged section in elevation through a portion of the mechanism enclosed in the cabinet; Fig. 6 is a corresponding view of the mechanism in plan; and Fig. 7 is a bottom plan view of the brush mechanism shown in Fig. 5.

Referring to the drawing, a cabinet 7 of any suitable material, such as sheet metal, is provided with a drop panel 8 having a leg 9 with a hinge 11, the leg serving to support the panel when in the lowered position, as shown in Fig. 2. This panel serves to close the upper compartment 12, and doors 13 close a lower compartment 14. The panel 8 has dishes 15 permanently attached to its inner surface in such a fashion that the panel constitutes a table set with a dinner service when lowered and supported at one end by the service cabinet, to which it is hinged, and at the other end by the leg 9. The construction of this panel has been described at length in Patent No. 1,881,416 and will not be further described. Since the dishes are permanently attached to the panel, the latter can be raised so as to close the cabinet 7 and the dishes will remain in position regardless of the inclination of the surface of the panel, it being understood that articles such as cups and glasses which cannot be permanently attached are removed before the cabinet is closed.

Within the upper compartment 12 is positioned a rectangular box 16 having perforations 17 in its forward face, this box-like structure being connected as by a conduit 17' to a supply of water under pressure. When the panel 8 is raised to close the cabinet, the water supply is turned on and numerous sprays of water will be thrown against the soiled dishes mounted on the inside of the panel. A gutter 18 is located in the bottom of the compartment 12 to carry off liquid and garbage to a drain 19. Also located in the upper compartment 12, are resistance elements 21 which are connected as by leads 100 and 101 to a source of current and serve to prevent condensation of moisture on the dishes and, generally, to aid in the drying of the same.

The lower compartment 14 of the cabinet is likewise supplied with box-like compartments or shower plates 22 and 23, these shower plates being perforated to throw sprays of water both upward and downward, as required and being respectively supplied with water as by means of conduits 103 and 104. The lower of these two plates also serves as a rack for holding utensils 24 such as cups and glasses, which cannot be permanently attached to the panel 8.

Below the lower plate 23 in the compartment 14 is a water-tight casing 25 which serves to enclose certain mechanism, to be referred to hereinafter, against contact with the liquid sprayed into the compartment. Passing upward through the upper side of this casing are shafts 26 mounted in suitable journals and enclosed by packing 27 to exclude water. Brushes 28 are carried by the shafts 26 and have a perforated shell 29 through which water under pressure may be passed to the bristles 31. A pot or other vessel 32 is inverted over the brush and held in place by clamps 33 engaging with the rolled edge of the pot. Water is supplied to the interior of the brush through a pipe 34.

Within the casing 25 and protected thereby from moisture, as mentioned above, is a drive mechanism for oscillating the brushes 28. The mechanism will be shown for one brush, but it will be readily understood that the motion may be communicated to as many brushes as are present by suitable connecting rods. A worm drive 35 is connected to an electric motor (not shown) and meshes with a gear 36 connected to a disc 37 by means of a connecting rod 38. The elements 36 and 37 are so positioned and the connecting rod 38 is attached at such points on their respective surfaces that a complete revolution of gear 36 rotates the disc 37 through an arc which is less than 180°, an arc of 100° being suitable. Thus continued rotation of the gear 36 by means of the worm 35 results in an oscillation of the disc 37, a complete revolution of the disc not being made. This oscillatory movement is transmitted through the shaft 26 to the brush 28, or to as many brushes as may be present and the bristles 31 are rubbed against the interior of the pot 32 in a manner simulating the ordinary hand scouring of such pots. This motion is much more effective in scouring a pot than would be a rotational motion.

As previously mentioned, water is forced into the interior of the brush and flows out through the perforated shell thereof to bathe the interior of the vessel being cleaned during the scrubbing operation. The water is conducted into the interior of the brush through the pipe 34 and this pipe passes through an arcuate slot 39 in the bottom 41 of the brush, this slot being as long or longer than the arc of travel of the brush during its oscillating movement. In addition to this arcuate slot, the bottom 41 is additionally perforated with perforations 42 so that the water admitted to the interior of the pot can flow out gradually and, mingling with the liquid from the sprays 22 and 23, flow into a gutter 43. This gutter communicates with the drain 19 similarly to the gutter 18.

In operation, the service cabinet described will form part of the furniture of a combined kitchen and dinette, the panel 8 being let down when a meal is to be served and the permanent dishes supplemented by cups, glasses, silverware, and such items as cannot readily be attached to the panel. After the meal has been consumed, the panel is raised with the soiled dishes attached thereto, the removable utensils having been taken away, and the panel closed into the cabinet. The leg 9 will fold against the side of the panel and the structure will be closed water-tight. At the same time, cups and glasses, and the like removable articles may be placed on the shower plate 23 and such culinary articles as pots, which require scouring, may be inverted over the brushes 28, being clamped down thereover by means of the clamps 33. Water will then be turned on in the shower plates 16, 22 and 23, which are connected to the municipal water supply. At the same time that the sprays are turned on, an electric motor is started to cause the oscillation of the brushes 28 and water is supplied through the pipes 34 from the same source as that supplying the shower plates above mentioned. Thus the dishes 15 on the panel 8, the removable articles 24, and the vessels 32 are all washed at the same time. As an aid in drying the dishes, electrical resistance elements 21 have been provided to overcome condensation of moisture on the dishes and as a general aid to drying. These resistance elements may be supplied from the same source of house current as the motor used for drying the brushes.

The utility of the cabinet may be increased by supplementing the panel 8 with a rack for holding what may be termed "loose" dishes, i. e. an ordinary dinner service, so that dishes may be inserted into appropriate holders and the panel then raised and the dishes in the rack washed by the spraying means in the cabinet. This may be done either by placing retaining means over the permanently attached dishes 15 or the dishes 15 may be carried by a removable mat which is replaceable by a rack or other holding means for ordinary dishes. In the case of a superimposed rack, the cabinet will be correspondingly deepened to accommodate the rack and contents.

The hereindescribed service cabinet functions to wash the dishes and other vessels used in the preparation of a meal with a minimum of attention from the housewife and, by its use, a set of dishes for the serving of a meal and an assortment of pots for its preparation may be washed and presented in clean condition for the preparation and serving of the next meal. Such a cabinet greatly reduces the labor involved in preparing meals and also economizes space in small apartments.

Other modes of applying the principle of my invention may be employed instead of the one explained, change being made as regards the mechanism herein disclosed, provided the means stated by any of the following claims or the equivalent of such stated means be employed.

We therefore particularly point out and distinctly claim as our invention:

1. A service cabinet comprising a casing, a dishwashing compartment therein, means for securing dishes in said compartment, a perforated spray head coextensive in area with said compartment and arranged therein opposite the dishes, means for discharging a washing fluid through the perforations in said head and against said dishes, electrical resistance elements arranged between said spray head and the dishes, and means for passing an electric current through said elements to heat the same for the purpose of drying the dishes.

2. A cabinet comprising a casing having a dishwashing and drying compartment, a drop panel carrying dishes permanently attached thereto and forming a closure for said compartment, a perforated spray head coextensive in area with said compartment and arranged therein so as to face said closure when the latter is in closed position, means for discharging a cleaning fluid through the perforations in said head and against said dishes, spaced electrical resistance elements disposed between said spray head and the dishes and means for passing an electric current through said elements to heat the same for the purpose of drying the dishes.

ALFRED A. H. UHALT.
MARY ANN LEVY UHALT.